(12) United States Patent
Keohane et al.

(10) Patent No.: US 8,468,209 B2
(45) Date of Patent: Jun. 18, 2013

(54) METHOD OF RESCINDING PREVIOUSLY TRANSMITTED E-MAIL MESSAGES

(75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2259 days.

(21) Appl. No.: 10/666,816

(22) Filed: Sep. 18, 2003

(65) Prior Publication Data

US 2005/0066009 A1    Mar. 24, 2005

(51) Int. Cl.
*G06F 15/16* (2006.01)
(52) U.S. Cl.
USPC .................................... 709/207; 709/206
(58) Field of Classification Search
USPC .................................. 709/206, 207
See application file for complete search history.

(56) References Cited

U.S. PATENT DOCUMENTS

| | | | | |
|---|---|---|---|---|
| 5,870,548 A | * | 2/1999 | Nielsen | 709/206 |
| 5,930,471 A | * | 7/1999 | Milewski et al. | 709/204 |
| 6,366,949 B1 | | 4/2002 | Hubert | 709/206 |
| 6,490,614 B1 | * | 12/2002 | Shaffer et al. | 709/206 |
| 6,810,408 B1 | * | 10/2004 | Bates et al. | 709/200 |
| 2001/0034739 A1 | | 10/2001 | Anecki et al. | |
| 2002/0046250 A1 | | 4/2002 | Nassiri | |
| 2002/0107928 A1 | * | 8/2002 | Chalon | 709/206 |
| 2002/0111947 A1 | | 8/2002 | Dalton | |
| 2002/0120705 A1 | | 8/2002 | Schiavone et al. | |
| 2002/0140986 A1 | | 10/2002 | Takayama | |
| 2002/0194288 A1 | | 12/2002 | Krueger et al. | |
| 2003/0009385 A1 | | 1/2003 | Tucciarone et al. | |
| 2003/0009528 A1 | | 1/2003 | Sharif | |

(Continued)

FOREIGN PATENT DOCUMENTS

| | | |
|---|---|---|
| EP | 1083699 A1 | 3/2001 |
| EP | 1087321 A1 * | 3/2001 |

(Continued)

OTHER PUBLICATIONS

*Java Applet Attached to E-Mail*, IBM Research Disclosure, 806, Jun. 1998.

(Continued)

*Primary Examiner* — Thomas Dailey
(74) *Attorney, Agent, or Firm* — James L. Baudino; John D. Flynn

(57) ABSTRACT

A method of rescinding previously transmitted e-mail messages are provided. After a sender composes an e-mail message, the message may be stored on a computing system when it is sent to the recipients. As customary, the e-mail message may contain a list of recipients to whom it is to be sent. A notification message is then generated and sent to the recipients (and to the sender) instead of the actual e-mail message. The notification message allows the recipients to automatically access the stored e-mail message. When and if the sender decides to rescind the message, the user may access the message and modify the list of recipients to exclude any number of recipients as well as to modify the text of the e-mail message. Any recipient whose e-mail address has been excluded will not be allowed to access the e-mail message.

4 Claims, 10 Drawing Sheets

U.S. PATENT DOCUMENTS

| | | | |
|---|---|---|---|
| 2003/0023695 A1* | 1/2003 | Kobata et al. | 709/206 |
| 2004/0059790 A1* | 3/2004 | Austin-Lane et al. | 709/207 |
| 2004/0122900 A1* | 6/2004 | Pous et al. | 709/206 |

FOREIGN PATENT DOCUMENTS

| | | |
|---|---|---|
| JP | 10107840 A2 | 4/1998 |
| JP | 11-340965 | 12/1999 |
| JP | 2000-196583 | 7/2000 |
| JP | 2001-168903 | 6/2001 |
| JP | 2001-345837 | 12/2001 |
| JP | 2003-141039 | 5/2003 |

OTHER PUBLICATIONS

*Java Applet Attached to E-Mail*, IBM Research Disclosure, 462, Apr. 1998.

* cited by examiner

| MESSAGES | PRIVATE KEYS |
|---|---|
| MESSAGE-ID$_1$ | PRIVATE KEY$_1$ |
| MESSAGE-ID$_2$ | PRIVATE KEY$_2$ |
| MESSAGE-ID$_3$ | PRIVATE KEY$_3$ |
| o | o |
| o | o |
| o | o |

METHOD OF RESCINDING PREVIOUSLY TRANSMITTED E-MAIL MESSAGES

BACKGROUND OF THE INVENTION

1. Technical Field

The present invention is directed to electronic mail (e-mail) messages. More specifically, the present invention is directed to a method of rescinding previously transmitted e-mail messages.

2. Description of Related Art

Electronic mail or e-mail is the transmission of messages over communications networks. The messages can be notes entered using a keyboard or electronic files stored on disks. Most e-mail systems include a rudimentary text editor for composing messages, but many allow a user to edit messages using any editor. After composing a message, the message is sent to a recipient by specifying the recipient's e-mail address in an address box. The message can also be sent or multicasted to several recipients at once if several recipients' e-mail addresses are specified in the box.

Sometimes, a user may realize that a recipient should not have been sent a message or that a message has some typographical and/or grammatical errors etc. that should be corrected before it is read by recipients. In those cases, the user may want to preclude the recipient from retrieving the e-mail message or correct the errors in the message before it is read by the recipients. Unfortunately, once an e-mail message has been transmitted it may not be withdrawn or modified.

Thus, a need exists for an apparatus, system and method of precluding a recipient from retrieving a message or allowing a message to be corrected after it has been transmitted.

SUMMARY OF THE INVENTION

The present invention provides a method of rescinding previously transmitted e-mail messages. After a sender composes an e-mail message, the message may be stored on a computing system when it is sent to the recipients. As customary, the e-mail message will contain a list of recipients to whom it is to be sent. A notification message is then generated and sent to the recipients (and to the sender) instead of the actual e-mail message. The notification message allows the recipients to automatically access the stored e-mail message. When and if the sender decides to rescind the message, the user may access the message and modify the list of recipients to exclude any number of recipients as well as to modify the text of the e-mail message. Any recipient whose e-mail address has been excluded will not be allowed to access the e-mail message. For security reasons, the stored message may be encrypted using the private key of a private key/public key pair. In this case, the public key will be provided in the notification message to allow the encrypted message to be decrypted.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
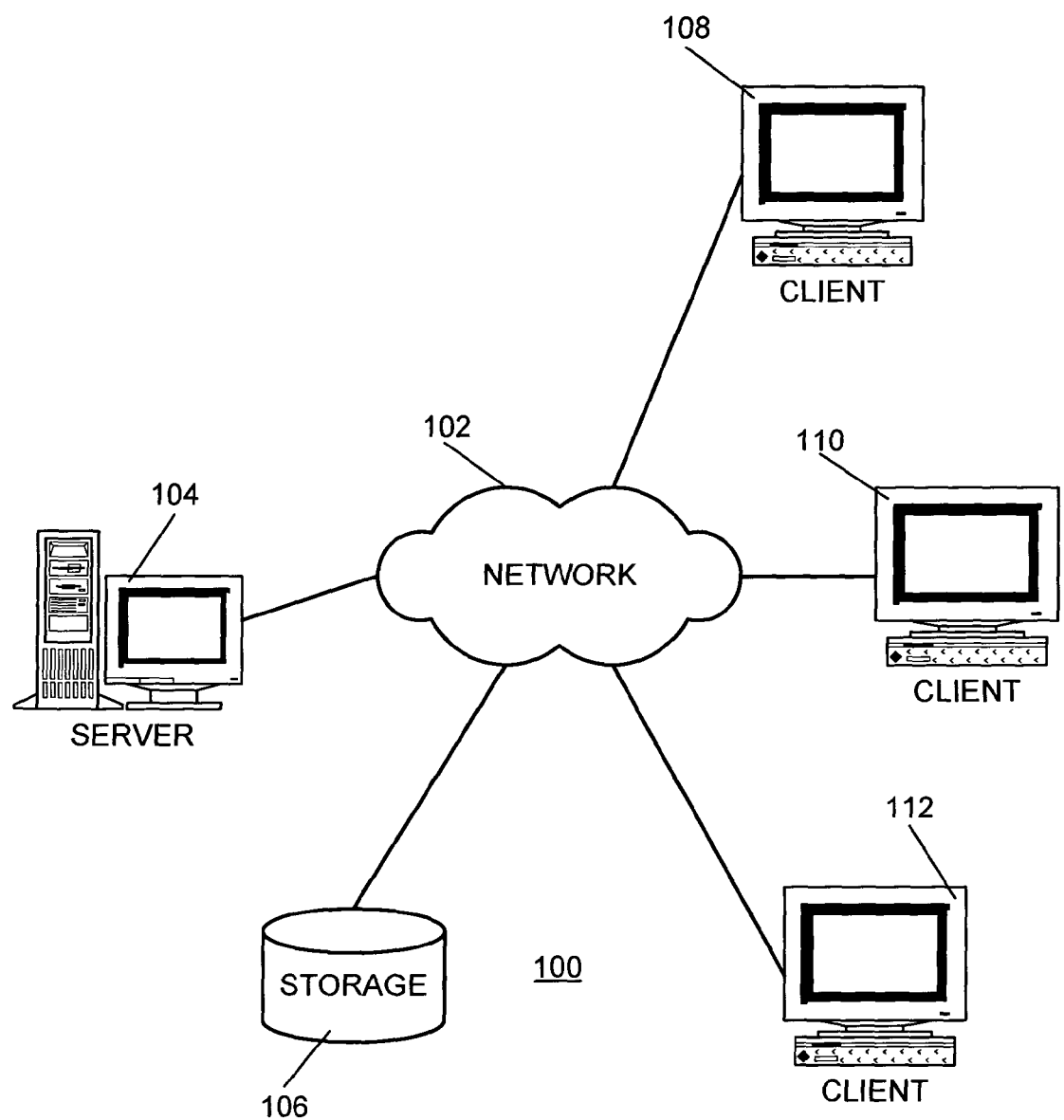
FIG. 1 is an exemplary block diagram illustrating a distributed data processing system according to the present invention.

With reference now to the figures wherein like reference numerals refer to like parts, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers, network computers, cellular phones, palm pilots or any other types of devices with a network communications access.

In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
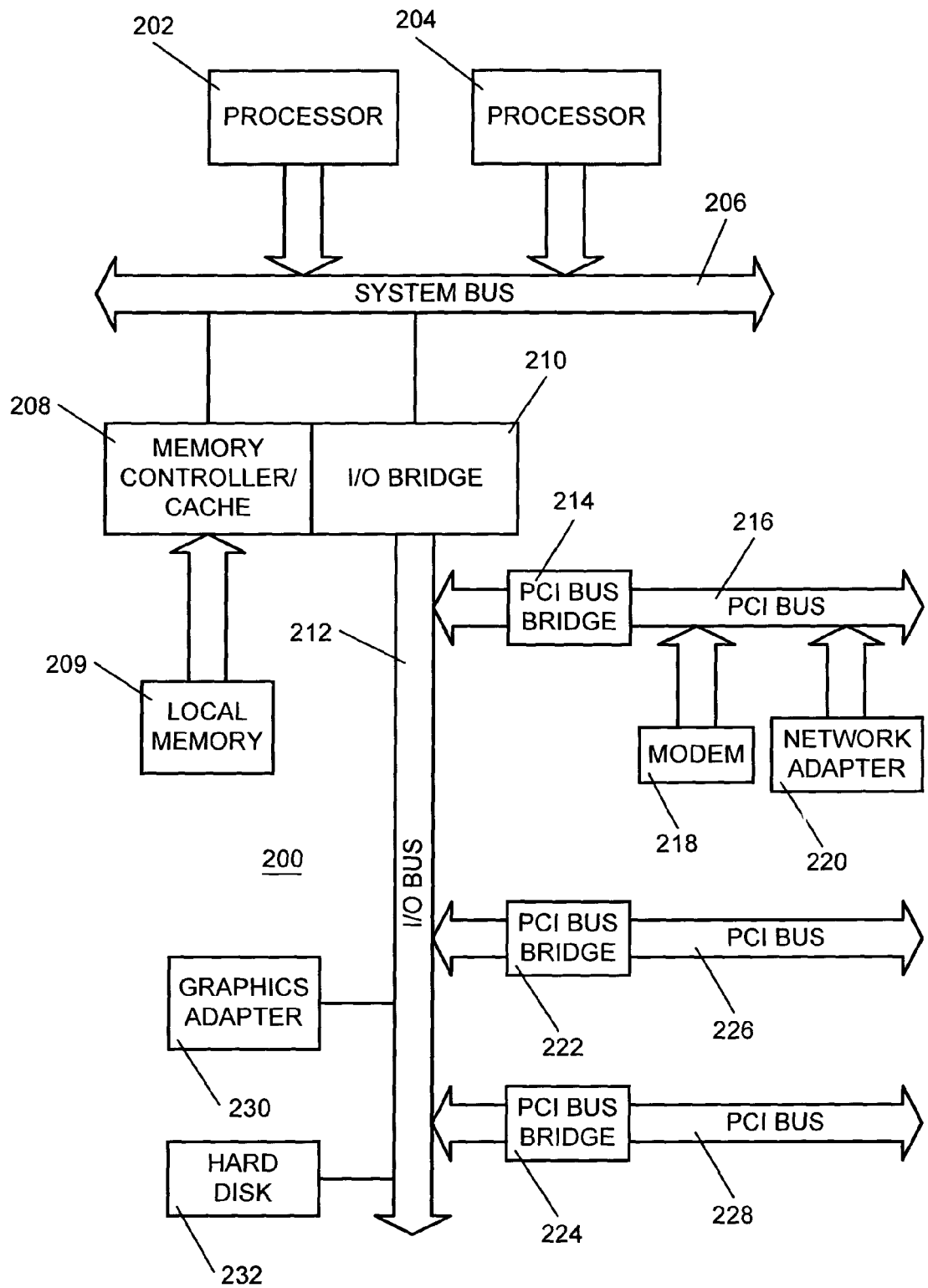
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
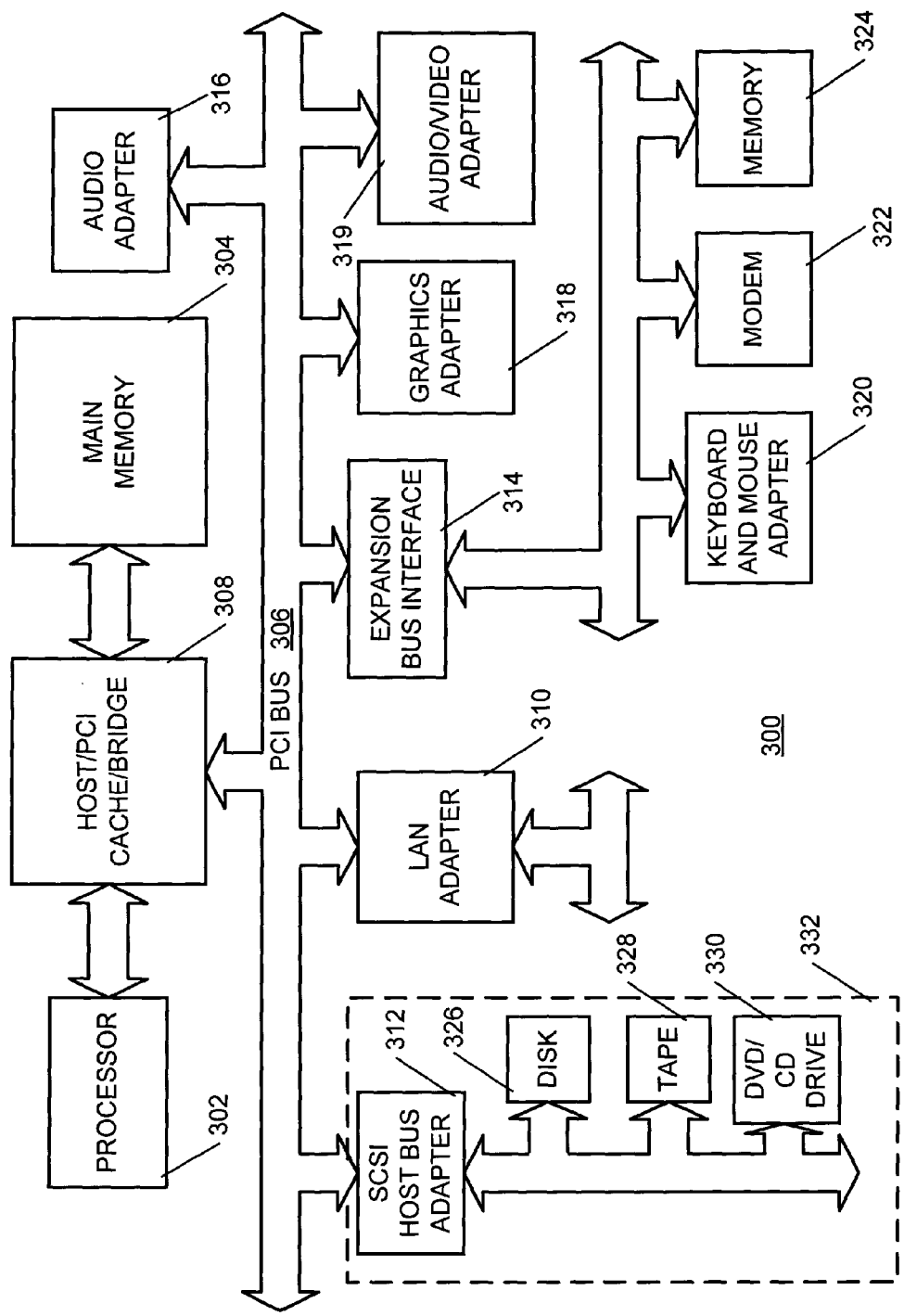
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows® XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus, system and method of rescinding previously transmitted e-mail messages or allowing a message to be modified after it has been transmitted. The invention may be local to client systems 108, 110 and 112 of FIG. 1 or to the server 104 or to both the server 104 and clients 108, 110 and 112. Further, the present invention may reside on any data storage medium (i.e., floppy disk, compact disk, hard disk, ROM, RAM, etc.) used by a computer system.

Figure 4A:
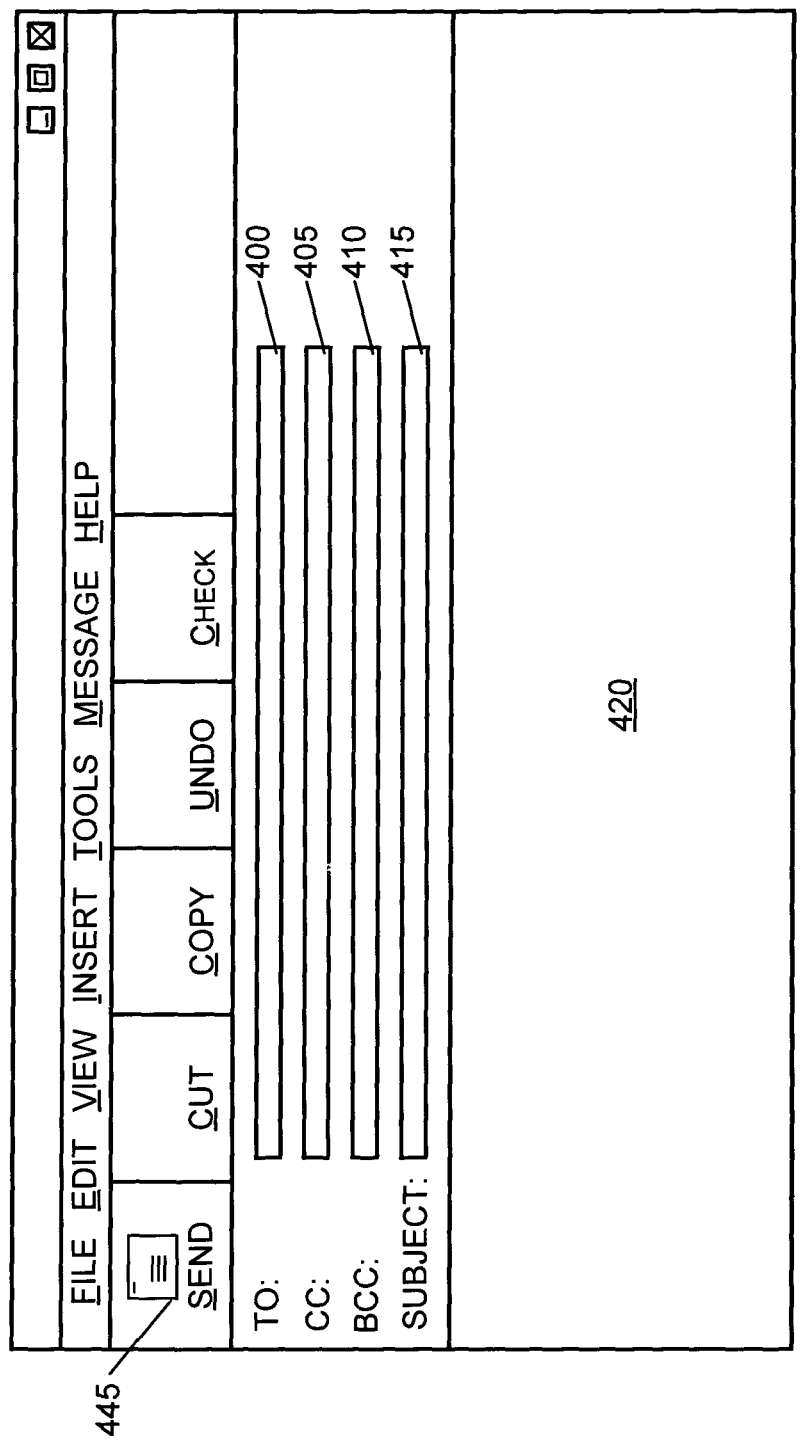
FIG. 4a is a graphical user interface (GUI) of an existing e-mail software tool.

FIG. 4a is a graphical user interface (GUI) of an existing e-mail software tool. In this figure, only the items that are of importance to the invention are given a reference numeral. The GUI has address box 400, carbon copy box 405, blind copy box 410, subject matter box 415 and message or text area 420. E-mail addresses of intended recipients are entered into address box 400. Carbon copy box 405 is used to enter the e-mail addresses of recipients who need to know about what is said in the message; but, the message is not necessarily addressed to them. Blind copy box 410 is used to enter the e-mail addresses of recipients that the user wishes to know about the content of the message, but as with the recipients in address box 405, the message is not addressed to them. Recipients whose e-mail addresses are entered in address box 400 and carbon copy box 405 are aware that they all receive the message. However, they are not aware that the recipients whose e-mail addresses are entered in blind copy box 410 receive the message also. But, the recipients whose e-mail addresses are entered in blind copy box 410 are aware that recipients whose e-mail addresses are entered in address box 400 and carbon copy 405 do receive the message. The subject matter of the message is entered in subject box 415 and the actual message is entered in text area 420.

When send button 425 is asserted, the e-mail message is transmitted to a mail server (i.e., the mail server servicing the sender). The server then sends the message to all the recipients whose e-mail addresses are entered in boxes 400, 405 and 410. As mentioned in the Description of the Related Art, once a message is sent to recipients, according to the prior art, it may not be withdrawn or modified. The present invention provides an apparatus, system and method of rescinding transmitted e-mail messages or allowing a transmitted message to be modified.

In accordance with the present invention, when the send button 445 is asserted, a message is sent to the e-mail addresses of the recipients notifying them that they have received an e-mail message. However, the e-mail message itself may remain on either the sender's computer system, on a mail server (e.g., the mail server of the Internet Service Provider (ISP) servicing the sender or each one of the recipients) or a regular Web server. The present invention, however, will be explained using a mail server (i.e., the e-mail message may remain on the mail server of the sender's ISP).

As with any transmitted e-mail message, the notification message may contain a message header. Message headers are not usually displayed unless a user specifically wants it shown. For example, in Microsoft Outlook Express, a user may display a message header by clicking on FILE and asserting PROPERTIES while the message is displayed. Then, if the user selects the tab labeled DETAILS and clicks on MESSAGE SOURCE, the message header will be displayed.

Figures 5, 7:
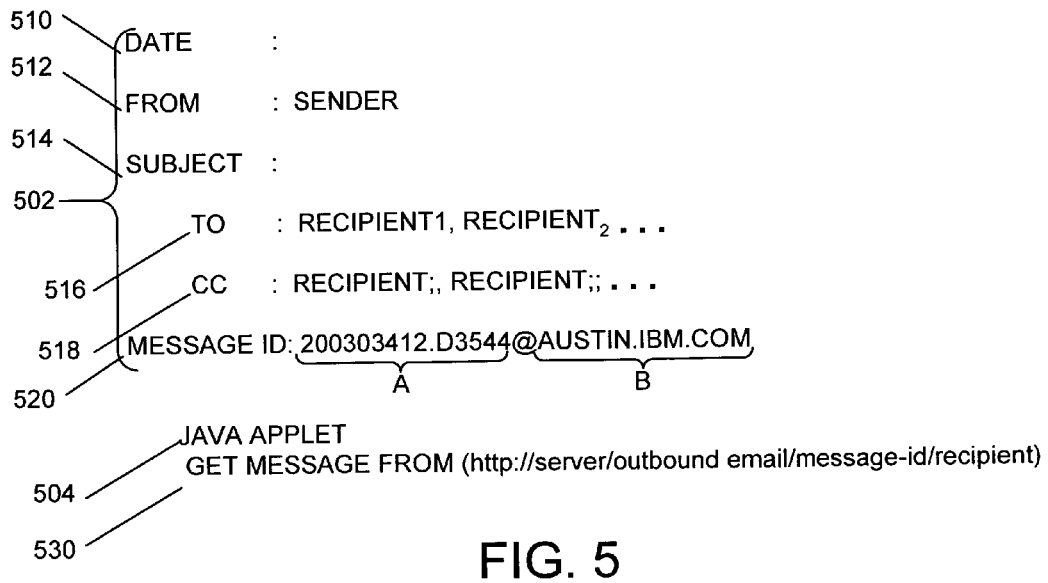
FIG. 5 depicts an exemplary header of an e-mail message.
FIG. 7 depicts a table cross-referencing message-Ids to private keys.

FIG. 5 depicts a representative notification message. The notification message includes a message header 502 and a JAVA applet 504. Note that only information pertinent to the invention is displayed in the message header 502. Particularly, the message header includes DATE 510 that the message was sent, the SENDER 512 of the message and lists 516 and 518 of recipients to whom the message was sent.

The message header also contains message-Id 520 of the message. Mail servers ordinarily assign a unique message identifier (i.e., message-Id) to every message sent to a recipient. Message-Ids help mail clients as well as mail servers keep track of messages. Further, message-Ids help system administrators (e.g., postmasters) troubleshoot technical issues such as mail loops or forged e-mail messages. The message-Id is made of two components (i.e., components A and B). Component A is a string of alphanumerical characters and component B is the name of the server that assigned the message-Id to the message. This server is generally the server servicing the message sender.

For security reasons, the server may generate a private key/public key pair for each message that it receives. The private key may be used to encrypt the message stored on the server and the public key may be included in the notification message. Thus, when a recipient attempts to retrieve the e-mail message using the notification message, the JAVA applet 504 may transparently execute, access and decrypt the encrypted e-mail message stored on the server using COMMAND 530. Alternatively, some sort of certificate may be used to authenticate the person accessing the e-mail message.

The sender of the message may also be sent the notification message. This will allow the sender to access the message at anytime. A password or some other sort of security measure may be used to ensure that only the sender is allowed to modify the message. When the sender accesses the message, it is displayed in a GUI that will enable the user to rescind the message altogether, preclude any one of the recipients from accessing the message or modify the message.

Figure 4B:
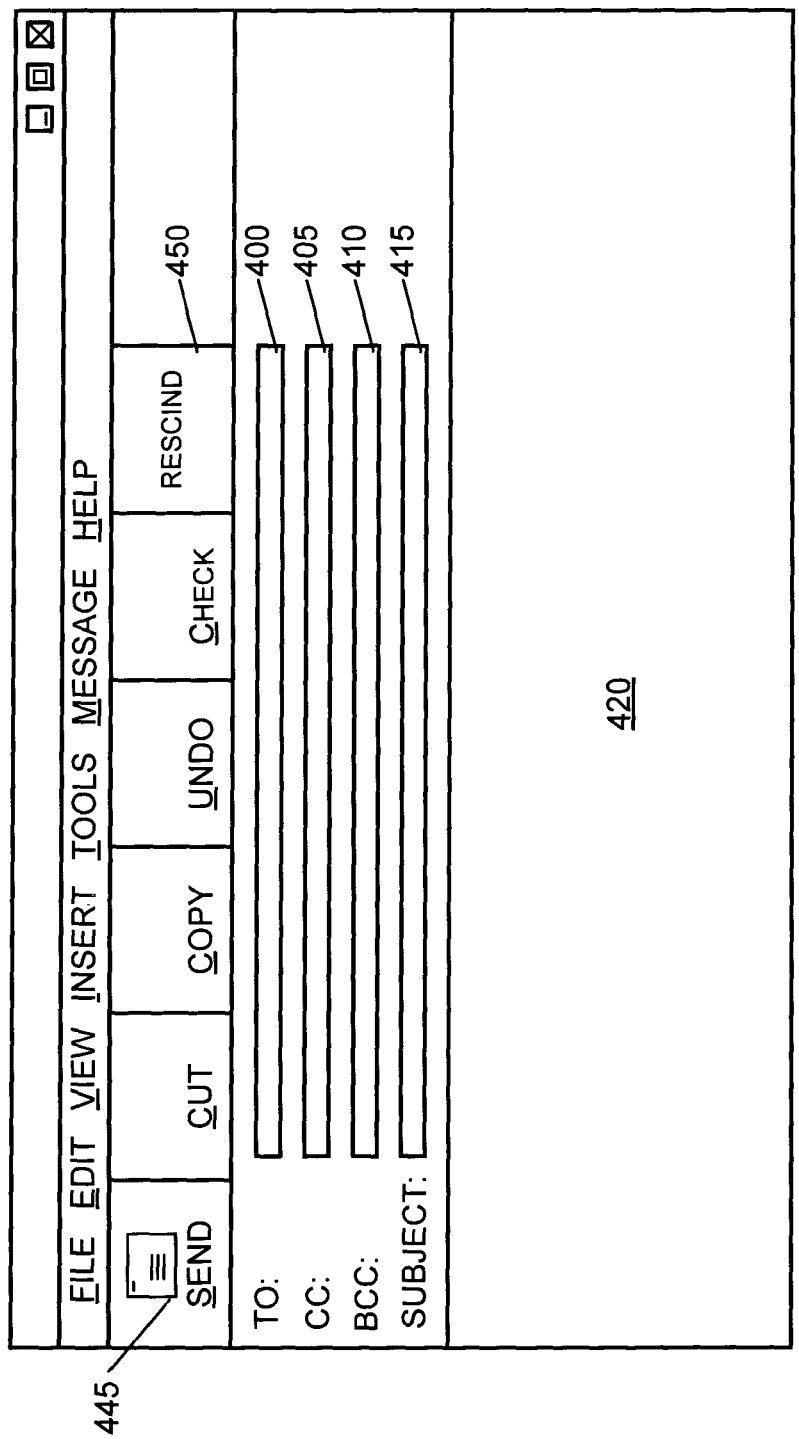
FIG. 4b is a GUI that may be used by the present invention.
Figure 6:
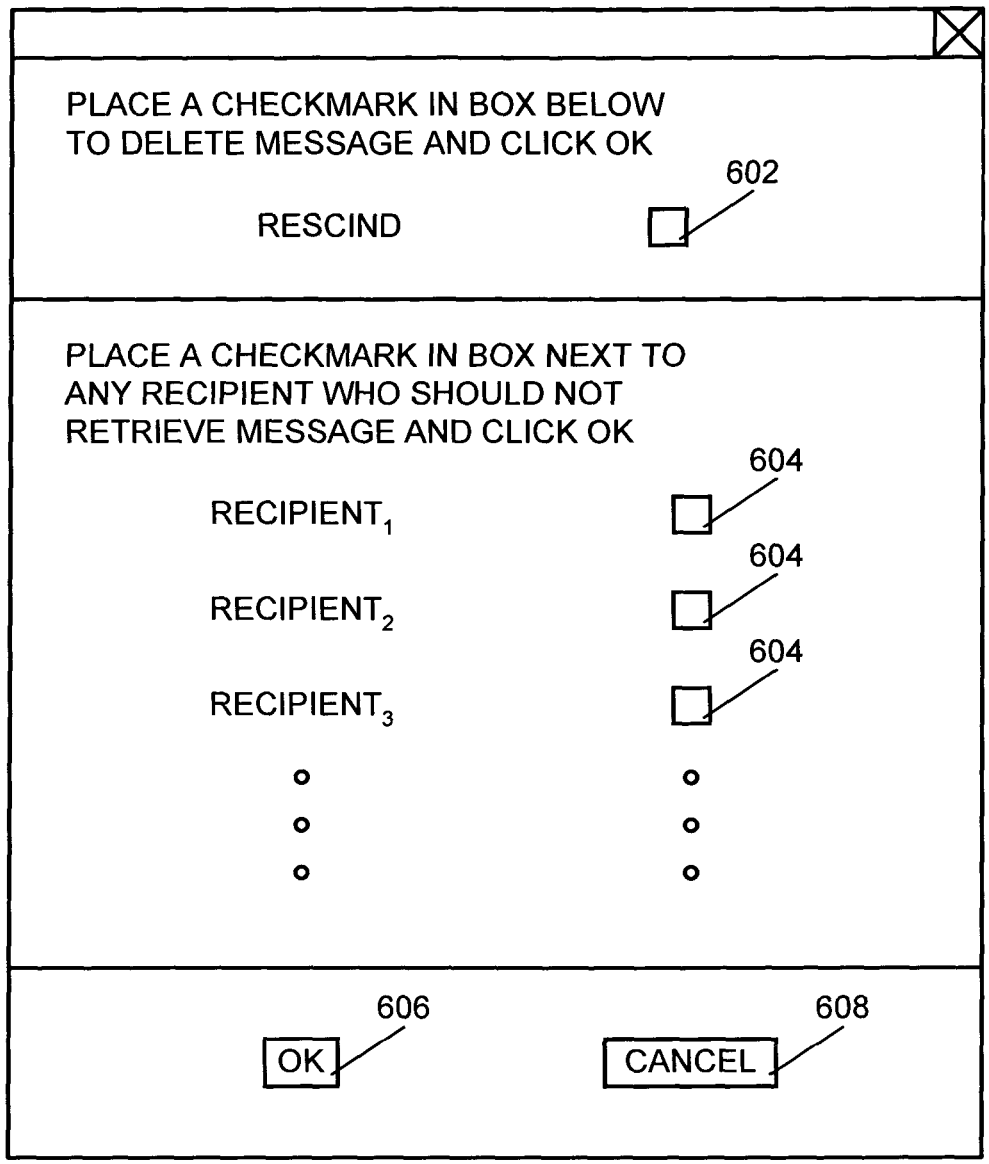
FIG. 6 depicts a representative GUI that may be used to rescind or preclude recipients from retrieving a message.

FIG. 4b is a GUI in which the message may be presented to the sender. Except for RESCIND button 450, the GUI is identical to the one in FIG. 4a. When RESCIND button 450 is asserted, the GUI in FIG. 6 may be displayed. FIG. 6 depicts a representative GUI that may be used to rescind or preclude recipients from accessing a message. The e-mail addresses of all the recipients to whom the message was addressed are listed in the figure. Thus, the sender may choose which one(s) of the recipients who are not to access the message. To do so, the sender may enter a checkmark in box 604 next to the e-mail addresses of the recipients to be precluded from accessing the message. If the sender enters a checkmark in box 602, a check mark will automatically be entered in all boxes 604. In this case, the e-mail message will be rescinded. When the sender is satisfied, the sender may assert OK button 606. Upon asserting OK button 606, FIG. 4b may be re-displayed. In this case, the e-mail address of any recipient who has been excluded will not be displayed in any of boxes 400, 405 and 410. As customary, if the sender reconsiders, the sender may assert CANCEL button 608. In any case, when a recipient who has been precluded from accessing the message attempts to retrieve the message, an error message such as "SORRY MESSAGE HAS BEEN RESCINDED" may be returned to the recipient.

The sender may also make any modifications to any part of the e-mail message while FIG. 4b is displayed. For example, the sender may modify the body of the e-mail message and/or delete e-mail addresses of recipients that should not access the message. When the sender re-sends the message using SEND button 445, the new message may then replace the original message.

In one embodiment, recipients who have already accessed the message before it is modified or before they have been precluded from accessing the message may be identified by having their e-mail addresses displayed in FIG. 6 in a highlighted or grayed out fashion. In those cases, a check mark may not be placed next to the e-mail addresses of those recipients. For example, recipient$_2$ is listed in a highlighted fashion which indicates that recipient$_2$ has already accessed the message. Thus, the sender may not enter a checkmark in box 604 next to recipient$_2$. In the present invention, however, the sender may preclude even those who already accessed the message from re-accessing the message.

In order for a new message to replace an original message, the new message must be identified as a modified version of the original message. Further, the message to be replaced must be identified. The invention may use a rescind bit to identify the message as a modified version of an original or previous message. Specifically, if the rescind bit is set, the message is a modified message. Otherwise, it is not. In operation, whenever the SEND button 445 in FIG. 4b (which has the RESCIND button 450) is asserted, the bit may be set.

To identify which message is to be replaced, the message-ID may be used. According to the invention, when a message is first sent by a sender, it will be assigned a message-Id. This Id will remain with any subsequent modifications of the message. Thus, when the sender asserts SEND button 445 while the message is displayed in FIG. 4b, the server may compare the message-Id of the message with the message-Ids of all stored messages on the server. To narrow down the number of stored messages that may be used in the comparison, the server may use the e-mail address of the sender. Thus, a stored message that has the same sender's e-mail address and the same message-Id as a modified message may be replaced by the modified message.

To ensure that the modified message, which will also be encrypted, will be able to be decrypted by the public key in the notification that has been sent to the recipients, the modified message may be encrypted with the same private key as the one used to encrypt the previous message. To keep track of which private key was used to encrypt which message, a table cross-referencing private keys with message-Ids may be used. FIG. 7 depicts such a cross-referencing table.

Figure 8:
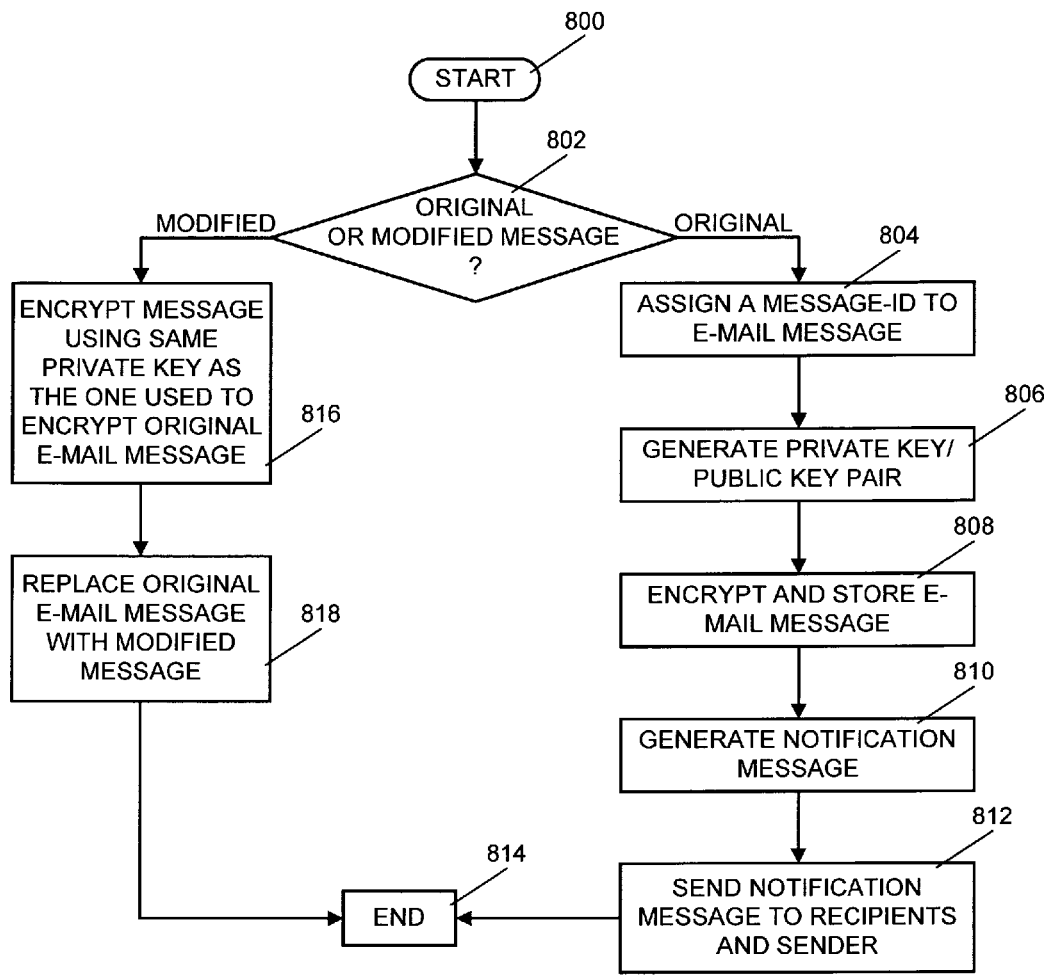
FIG. 8 is a flowchart of a process that may be used by a mail server servicing a sender.

FIG. 8 is a flowchart of a process that may be used by a mail server servicing a sender when storing messages. The process starts when the mail server receives an e-mail message from a sender. The server at that time will determine whether the message is an original message of a modified message. If it is an original message, the server will assign a message-Id to the message, generate a private key/public key pair. Using the private key, the server will encrypt the message. The encrypted message may then be stored on the server. The server may also generate a notification message which may be sent to the recipients and sender of the e-mail message. The notification message may contain a JAVA applet that may run in the background when a recipient or the sender attempts to retrieve the message. Specifically, the JAVA applet may retrieve the actual message text via a secure http connection to the described location on the server. The JAVA applet may have knowledge of the public key or certificate, thus making this secure connection possible (steps 800, 802, 804, 806, 808, 810 and 812).

If the message is a modified message, the server may consult the cross-referencing table in FIG. 7 to determine which private key to use to encrypt the message. As mentioned earlier, the private key used has to be the same as the one used to encrypt the original message. After encrypting the modified message, the sender may replace the original (or previous) message in storage with the modified message before the process ends (steps 800, 802, 814 816 and 812).

Figure 9:
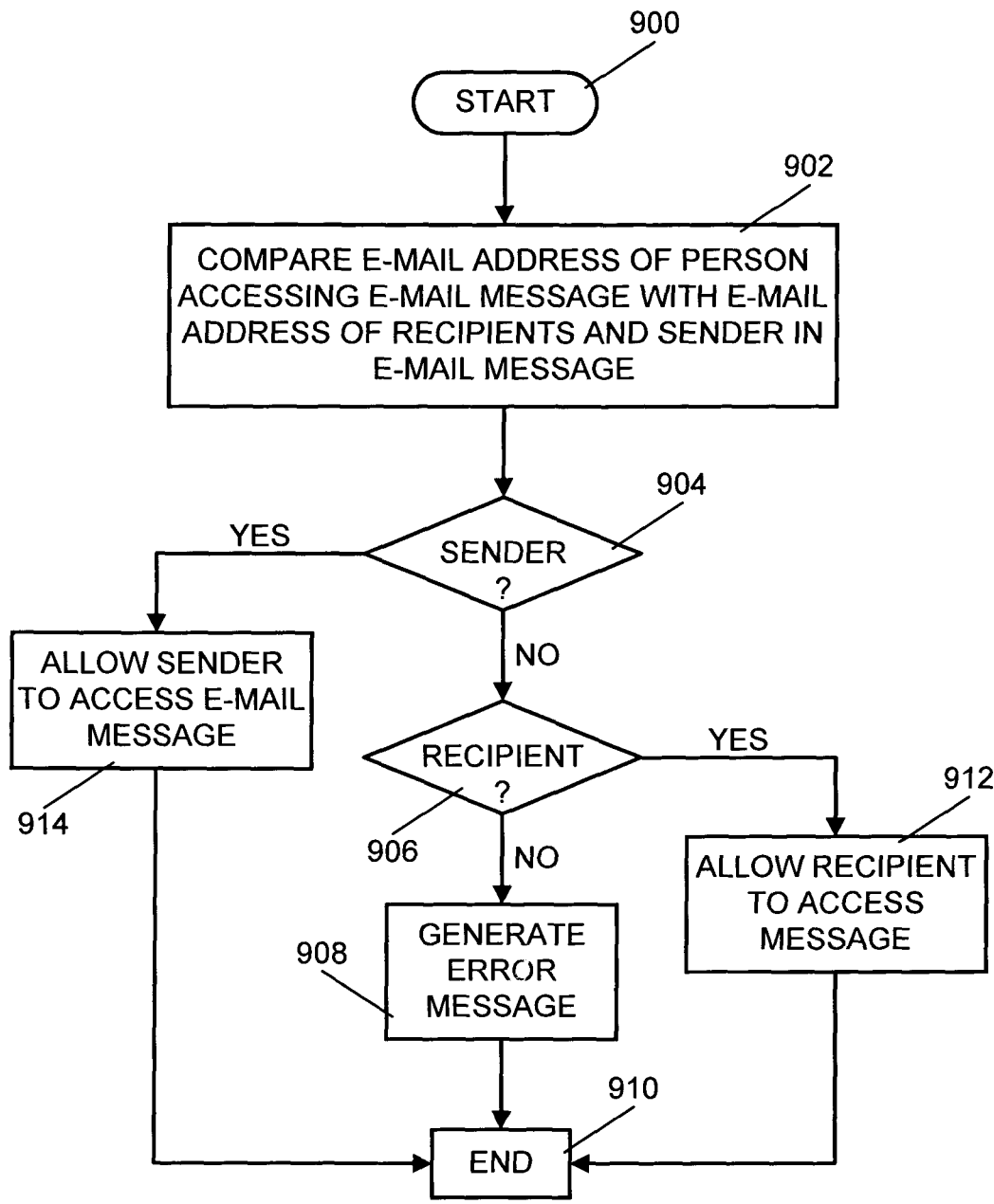
FIG. 9 is a flowchart of a process that may be used by a server servicing a sender when an e-mail message is being accessed.

FIG. 9 is a flowchart of a process that may be used by a server servicing a sender when an e-mail message is being accessed. The server will compare the e-mail address of the person attempting to access the e-mail message with the email addresses of the recipients and the sender of the message. If the person attempting to access the e-mail message has the same e-mail address as the sender or anyone of the recipients of the e-mail message, the person will be allowed to access the e-mail message. Otherwise, an error message such as MESSAGE HAS BEEN RESCINDED may be generated before the process ends (steps 900, 902, 904, 906, 908, 910, 912 and 914).

Figure 10:
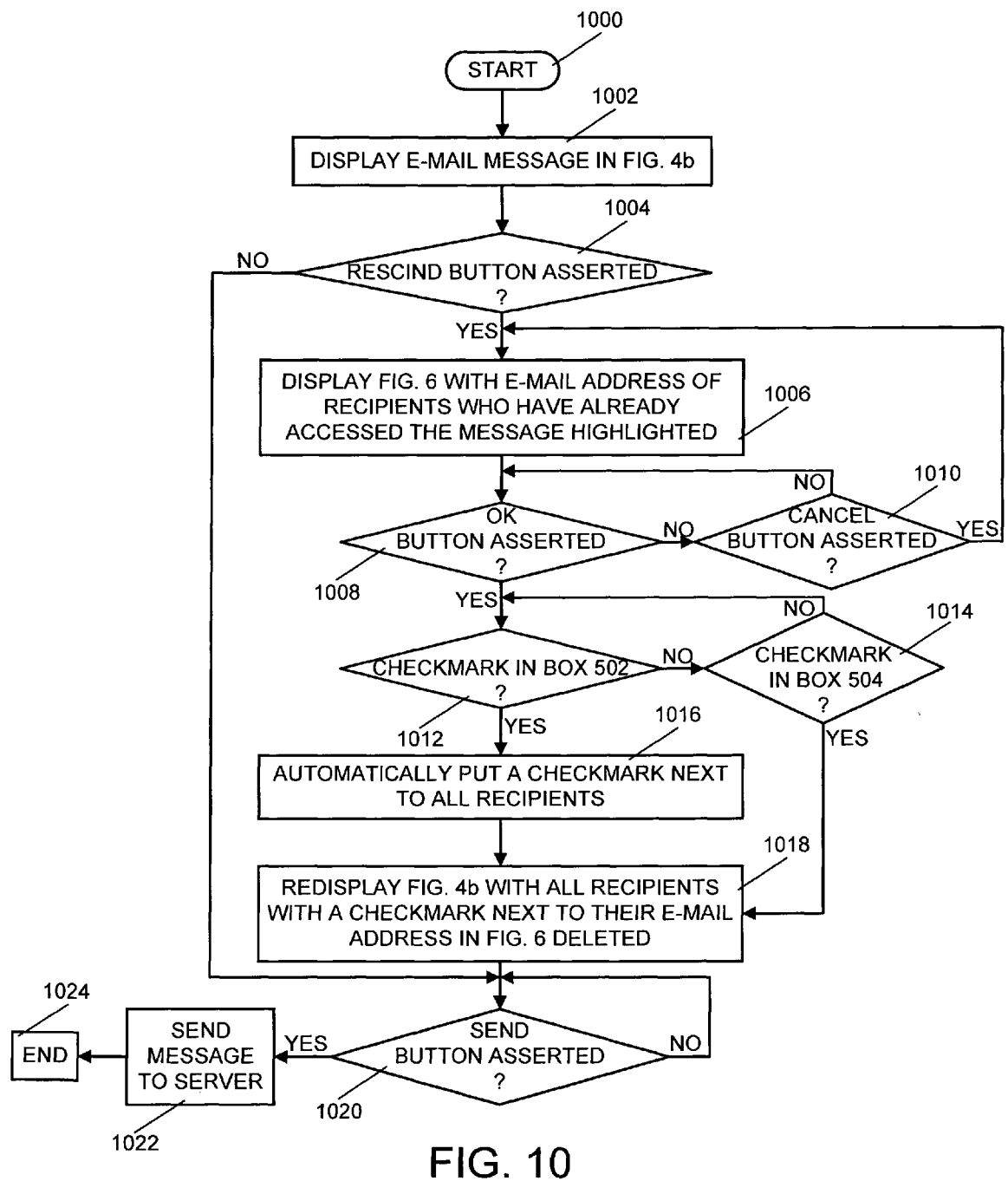
FIG. 10 is a flowchart of a process that may be used to allow a sender to modify or rescind an e-mail message.

FIG. 10 is a flowchart of a process that may be used to allow a sender to modify or rescind an e-mail message. The process starts when a sender accesses an e-mail message stored on a server using the notification message. If the sender used a password and enters the correct password, the accessed message may be displayed in FIG. 4*b*. A check will be made to determine whether RESCIND button 450 is asserted. If so, FIG. 6 will be displayed. The e-mail addresses of all recipients who have already accessed the message may be displayed in a grayed out or highlighted fashion in FIG. 6. Also, the user may put a checkmark in box 604 next to any recipient that should not be allowed to access the e-mail message. Alternatively, the user may enter a checkmark in box 602. A checkmark in box 602 will automatically preclude all recipients from accessing the e-mail message. Upon asserting OK button 606, FIG. 4*b* may again be displayed. As mentioned earlier, the sender may make any modifications to the e-mail message displayed in FIG. 4*b*. After all modifications are made to the message, the sender may resend the message to the server and the process may then end (steps 1000, 1002, 1004, 1006, 1008, 1010, 1012, 1014, 1016, 1018, 1020, 1022 and 1024).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of modifying a previously transmitted e-mail message by a sender, the message being addressed to a list of recipients, the method comprising:
   storing the e-mail message on a computing system;
   generating a notification message, the notification message for allowing recipients from the list of recipients and the sender to access the stored e-mail message;
   sending the notification message to the recipients from the list of recipients and to the sender; and
   enabling the sender to modify the stored e-mail message using the notification message wherein the enabling step includes:
      determining whether at least one recipient from the list of recipients has already accessed the stored e-mail message;
      displaying the list of recipients and a copy of the stored e-mail message to the sender wherein all recipients from the list of recipients that are determined to have already accessed the stored e-mail message are displayed in a distinguishing fashion from recipients that have not already accessed the stored e-mail message;
      allowing the sender to modify the displayed copy of the stored e-mail message and to send the modified copy to the recipients that have not already accessed the stored e-mail message; and
      replacing the stored e-mail message with the modified copy once the modified copy is sent to the recipients that have not already accessed the stored e-mail message.

2. The method of claim 1 wherein the stored e-mail message has a text portion, the text portion being modified by the sender.

3. The method of claim 1 wherein the list of recipients is modified by the sender by adding new recipients to the list or deleting recipients from the list.

4. The method of claim 1 wherein the stored e-mail message is encrypted by a private key of a private key/public key pair, the public key being in the notification message for automatically decrypting the stored e-mail message.

* * * * *